(12) United States Patent
Koizumi et al.

(10) Patent No.: US 12,451,136 B2
(45) Date of Patent: Oct. 21, 2025

(54) AUDIO CAPTION GENERATION METHOD, AUDIO CAPTION GENERATION APPARATUS, AND PROGRAM

(71) Applicant: NTT, Inc., Tokyo (JP)

(72) Inventors: Yuma Koizumi, Tokyo (JP); Masahiro Yasuda, Tokyo (JP)

(73) Assignee: NTT, Inc., Tokyo (JP)

( * ) Notice: Subject to any disclaimer, the term of this patent is extended or adjusted under 35 U.S.C. 154(b) by 195 days.

(21) Appl. No.: 18/036,612

(22) PCT Filed: Nov. 18, 2020

(86) PCT No.: PCT/JP2020/043028
§ 371 (c)(1),
(2) Date: May 11, 2023

(87) PCT Pub. No.: WO2022/107250
PCT Pub. Date: May 27, 2022

(65) Prior Publication Data
US 2024/0021201 A1 Jan. 18, 2024

(51) Int. Cl.
*G10L 15/26* (2006.01)
*G06F 16/632* (2019.01)

(52) U.S. Cl.
CPC ............ *G10L 15/26* (2013.01); *G06F 16/634* (2019.01)

(58) Field of Classification Search
CPC .............................. G10L 15/26; G06F 16/634
See application file for complete search history.

(56) References Cited

U.S. PATENT DOCUMENTS

| 10,999,566 B1* | 5/2021 | Mahyar ................ G06F 40/166 |
| 2020/0372066 A1* | 11/2020 | Saggi ..................... G06N 20/00 |
| 2022/0130408 A1* | 4/2022 | Younessian .......... H04N 21/233 |
| 2022/0148614 A1* | 5/2022 | Block .................... G10L 15/26 |

OTHER PUBLICATIONS

Koizumi et al. (2020) "A Transformer-based Audio Captioning Model with Keyword Estimation," Interspeech, Oct. 25-29, 2020, Shanghai, China.
Takeuchi et al. (2020) "Effects of Word-Frequency Based Pre- and Post-Processings for Audio Captioning," Detection and Classification of Acoustic Scenes and Events (DCASE) Workshop, Nov. 2-3, 2020, Tokyo, Japan.
Kim et al. (2019) "AudioCaps: Generating Captions for Audios in the Wild," Proceedings of NAACL-HLT 2019, pp. 119-132, Minneapolis, Minnesota, Jun. 2-Jun. 7, 2019.

* cited by examiner

Primary Examiner — Stella L. Woo (57) ABSTRACT

Even in a case where an amount of training data is small, a caption for an audio signal is generated with high accuracy. An audio caption generation apparatus (1) generates a caption for an input target audio. A training data storage (10) stores a training data set including a set of an audio signal and a caption corresponding thereto. An audio similarity calculation unit (11) calculates similarity between the target audio and each audio signal of training data. A guidance caption retrieval unit (12) acquires a plurality of captions corresponding to an audio signal similar to the target audio. A caption generation unit (13) generates a caption for the target audio by determining words in order from the head on the basis of the acquired captions.

4 Claims, 5 Drawing Sheets

FIG. 1

FIG. 2A  SIMILAR/NOT SIMILAR LABELING

FIG. 2B  GUIDANCE CAPTION RETRIEVAL MODEL TRAINING

AUDIO CAPTION GENERATION METHOD, AUDIO CAPTION GENERATION APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/043028, filed on 18 Nov. 2020, the disclosure of which is hereby incorporated herein by reference in its entirety.

TECHNICAL FIELD

The present invention relates to a technique for generating a natural sentence explaining an audio signal.

BACKGROUND ART

Audio captioning is a task of converting an observed acoustic feature sequence $\Phi=(\varphi_1, \ldots \varphi_T)$ into a (sub)word token sequence $(w_1, \ldots)$ corresponding to a caption thereof. Here, $\varphi_t \in R^{D_a}$ (where $t=1, \ldots, T$) represents an acoustic feature vector of the time index t, T represents the number of time frames of the observed acoustic feature sequence, and $D_a$ represents the number of dimensions of the acoustic feature. The output $w_n \in$ (Natural numbers) (where = $1, \ldots, N$) is an index of the n-th token and N is a length of the (sub)word token sequence.

Symbols such as "→" used in the following description which are rightfully required to be written above the immediately preceding character, are written immediately after the character due to limitations of text notation. In a mathematical formula, these symbols are placed in the rightful positions, that is, directly above the characters.

In many conventional studies, the above conversion problem is solved by an encoder-decoder framework using a deep neural network (DNN) (refer to Non-Patent Literatures 1 and 2). First, an encoder converts the acoustic feature sequence $\Phi$ into a vector v of another feature space, and a decoder estimates the n-th output word $w_n$ referring to the vector v and the first to (n-1)-th output words $w_1, \ldots, w_{n-1}$.

[Math. 1]

$$v = \text{Enc}(\Phi) \quad (1)$$

$$p(w_n | \vec{W}_{n-1}) = \text{Dec}(v, \vec{W}_{n-1}) \quad (2)$$

Here, $\vec{w}_{n-1} = (w_1, \ldots, w_{n-1})$, and $w_n$ is estimated from the posterior probability $p(w_n | \Phi, \vec{w}_{n-1})$ by using beam search or the like (refer to Non-Patent Literature 2).

PRIOR ART LITERATURE

Non-Patent Literature

Non-Patent Literature 1: Y. Koizumi, R. Masumura, K. Nishida, M. Yasuda, and S. Saito, "A Transformer-based Audio Captioning Model with Keyword Estimation," in Proc. Interspeech, 2020. Non-Patent Literature 2: D. Takeuchi, Y. Koizumi, Y. Ohishi, N. Harada, and K. Kashino, "Effects of Wordfrequency based Pre- and Post-Processings," in Proc. Detect. Classif. Acoust. Scenes Events (DCASE) Workshop, 2020.

Non-Patent Literature 3: C. D. Kim, B. Kim, H. Lee, and G. Kim, "AudioCaps: Generating Captions for Audios in The Wild," in Proc. N. Am. Chapter Assoc. Comput. Linguist.: Hum. Lang. Tech. (NAACL-HLT), 2019.

SUMMARY OF THE INVENTION

Problems to be Solved by the Invention

A large amount of training data is required to construct a conventional encoder-decoder framework using a large-scale deep neural network. However, audio captioning often has less training data available than other tasks. In fact, AudioCaps (refer to Non-Patent Literature 3), which is a representative data set for audio captioning, includes only 49,838 captions for training. This is only about 1/1000 of the data amount compared with about 36 million pairs of training sentences included in WMT 2014, which is a data set for English-French machine translation.

In view of the technical problem as described above, an objective of the present invention is to generate a caption for an audio signal with high accuracy even in a case where an amount of training data is small.

Means to Solve the Problems

In order to solve the above problem, according to an aspect of the present invention, there is provided an audio caption generation method of generating a caption for a target audio where a guidance caption retrieval unit acquires a plurality of captions corresponding to an audio signal similar to the target audio and a caption generation unit generates a caption for the target audio by determining words in order from a head of the caption on the basis of the acquired captions.

Effects of the Invention

According to the present invention, it is possible to generate a caption for an audio signal with high accuracy even in a case where an amount of training data is small.

BRIEF DESCRIPTION OF THE DRAWINGS

FIG. 2A is a diagram illustrating a procedure of labeling training data with similar/not similar.

DETAILED DESCRIPTION OF THE EMBODIMENTS

Summary of Invention

One promising strategy when an amount of training data is insufficient is the use of a pre-trained model. In tasks such as acoustic event detection and scene classification, a pre-trained model such as VGGish (refer to Reference Literature 1) has been reported in order to obtain better results with a small amount of training data. Similarly, also in natural language processing, a large-scale pre-trained language model such as Bidirectional Encoder Representations from Transformers (BERT) (refer to Reference Literature 2) or Generative Pre-trained Transformer (GPT) (refer to Reference Literature 3) improves performance of various tasks. In particular, since an autoregressive pre-trained language model such as GPT has a deep relationship with the decoder in Formula (2), it can be expected to improve the accuracy of audio captioning by using the autoregressive pre-trained language model. Hereinafter, the autoregressive pre-trained language model such as GPT will be simply referred to as a "pre-trained language model". A point of the present invention is to generate an audio caption by using such a pre-trained language model.

[Reference Literature 1] S. Hershey, S. Chaudhuri, D. P. W. Ellis, J. F. Gemmeke, A. Jansen, R. C. Moore, M. Plakal, DvPlatt, R. A. Saurous, B. Seybold, M. Slaney, R. Weiss, and K. Wilson, "CNN Architectures for LargeScale Audio Classification," in Proc. Int. Conf. Acoust. Speech Signal Process. (ICASSP), 2017.

[Reference Literature 2] J. Devlin, M.-W. Chang, K. Lee, and K. Toutanova, "BERT: Pre-training of Deep Bidirectional Transformers for Language Understanding," in Proc. N. Am. Chapter Assoc. Comput. Linguist.: Hum. Lang. Tech. (NAACL-HLT), 2019.

[Reference Literature 3] A. Radford, J. Wu, R. Child, D. Luan, D. Amodei, and I. Sutskever. "Language models are unsupervised multitask learners," Tech. rep., OpenAI, 2019.

However, such a pre-trained language model cannot be directly applied to audio captioning. This is because the pre-trained language model is a model of $p(w_n|\vec{w}_{n-1})$, and the feature $\Phi$ extracted from the audio signal cannot be directly input. Therefore, a specific problem to be solved by the present invention is "in order to benefit from the pre-trained language model in a cross-modal translation task such as audio captioning, how should the original modal information be input to the pre-trained language model?"

Figure 1:
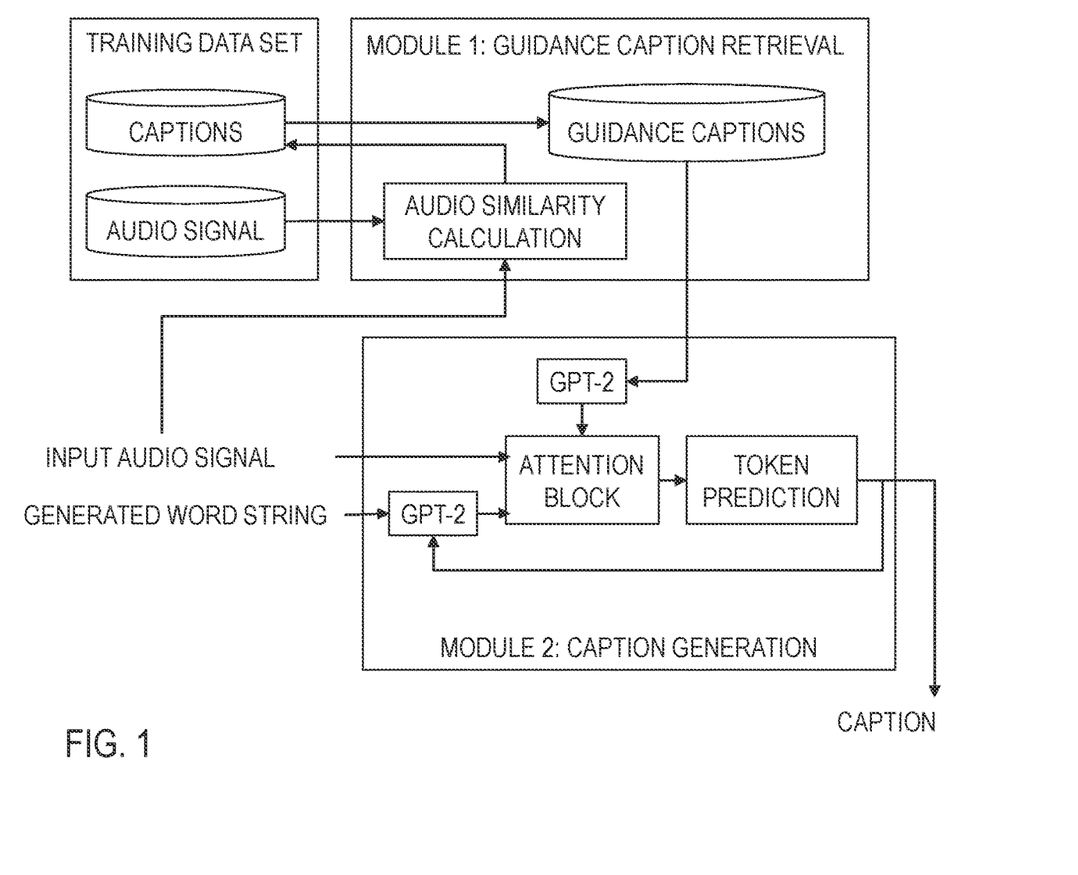
FIG. 1 is a conceptual diagram for describing an outline of the present invention.

The present invention solves the above problems as follows. As illustrated in FIG. 1, the present invention is a cascade system including two modules. The first module "guidance caption retrieval" operates like a conventional encoder. This module evaluates the similarity between input audio and audio of the training data, acquires a plurality of captions assigned to "similar audio" in the training data, and outputs the captions. Hereinafter, these captions will be referred to as "guidance captions". The second module "caption generation" operates like a conventional decoder. This module generates a caption for input audio by using the pre-trained language model while referring to the guidance captions. With this configuration, it is not necessary to directly input speech to the pre-trained language model, and the pre-trained language model can be used for audio captioning.

Guidance Caption Retrieval

Figure 2A:
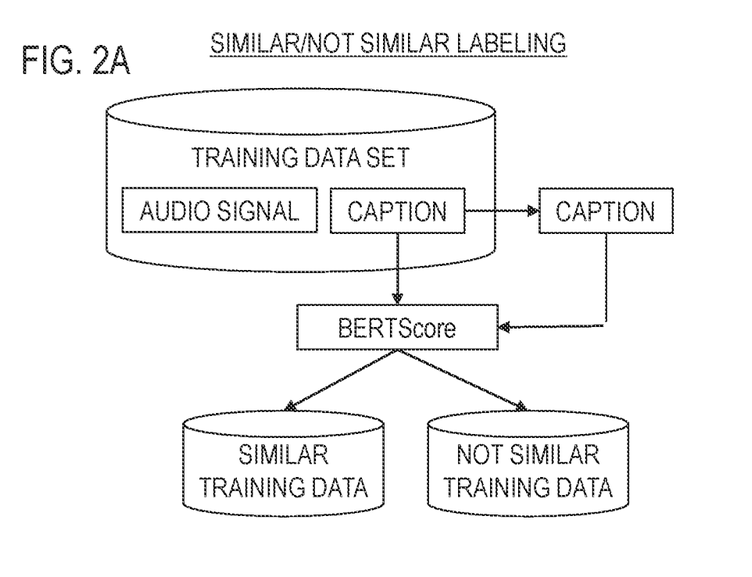
Figure 2B:
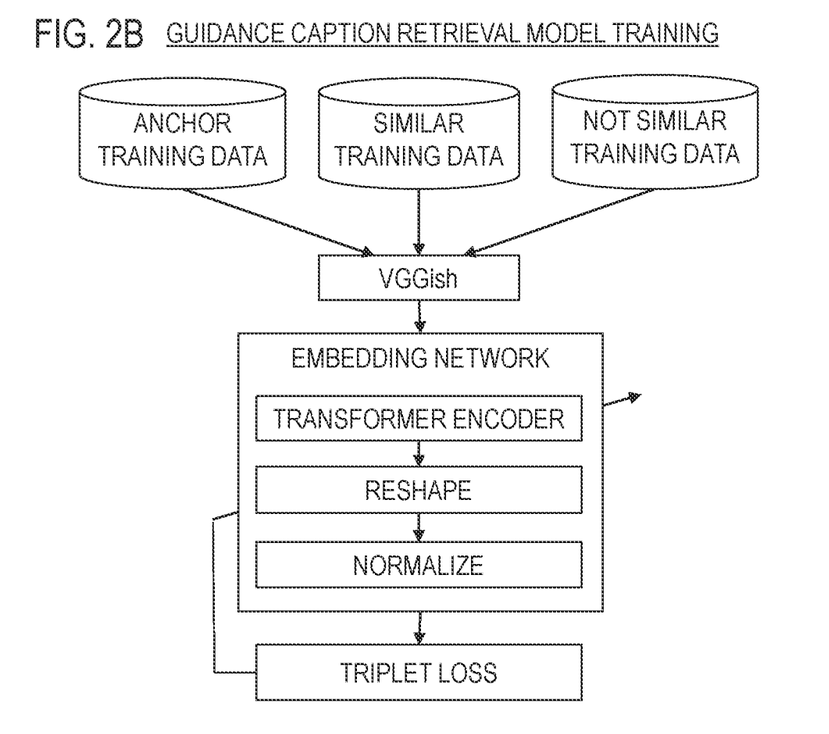
FIG. 2B is a diagram illustrating a procedure of training a model that retrieves guidance captions.

The purpose of the first module "guidance caption retrieval" is to acquire guidance captions from training data on the basis of a similarity of audio (hereinafter, as "audio similarity"). Here, the audio similarity does not mean that the similarity between acoustic features is simply calculated. For example, a siren of a police car and a siren of an ambulance have similar acoustic feature, but words used for captions are "police car" and "ambulance", respectively, and are completely different. That is, the audio similarity used in the present invention needs to take a high value audio in a case where captions for two audios are similar to each other even if the corresponding audios are not similar to each other. In order to achieve this requirement, training of this module includes: (a) calculating sentence similarity between captions included in a training data set (refer to FIG. 2A); and (b) training a deep neural network that predicts similarity from two audios (refer to FIG. 2B).

First, labeling of (a) will be described. Various similarity measures of captions such as BLEU, CIDEr, and SPICE have been proposed so far. In the present invention, any measure may be employed, but the following description will be made using BERTScore (refer to Reference Literature 4).

[Reference Literature 4] T. Zhang, V. Kishore, F. Wu, K. Q. Weinberger, and Y. Artzi, "BERTScore: Evaluating Text Generation with BERT," in Proc. of Int. Conf. Learn. Representations (ICLR), 2020.

A detailed procedure of similarity calculation between captions is as follows.

1. BERTScores between all captions in the training data set are calculated.

2. All BERTScores from the training data set are acquired, and are then normalized such that the maximum and minimum values are 1 and 0, respectively.

3. A caption exceeding a threshold value is labeled with "similar", and other captions are labeled with "not similar". The threshold value may be set to, for example, 0.7.

Next, model training of (b) will be described. First, a certain deep neural network is used to convert an observed signal x in the time domain into a fixed dimension vector. Similarly, all pieces of audio data included in the training data set are also converted into fixed dimension vectors. Distances between these vectors are calculated by a predetermined function, and captions assigned to the top K pieces of training data having small distances are output as $\vec{w}^{ref}$. The distance may be any distance. For example, L2 distance $D(a,b)=\|a-b\|_2^2$ may be used.

The deep neural network may be implemented in any manner. Here, as one of examples, a method of combining a VGGish trained in advance and an embedding network that can be trained will be described.

First, the observed signal x in the time domain is converted into an acoustic feature sequence $\Phi$ by using the VGGish trained in advance.

[Math. 2]

$$\Phi=\text{VGGish}(x) \quad (3)$$

Here, $\Phi \in R^{D_a \times T}$, and in the case of VGGish, $D_a=128$. It is not necessary to update parameters of VGGish at the time of training.

Next, the acoustic feature sequence $\Phi$ is converted into e by using the embedding network.

[Math. 3]

$$e=\text{Embed}_{\theta_e}(\Phi) \quad (4)$$

Here, Embed(•) is an embedding network, and for example, a Transformer-encoder layer (refer to Reference Literature 5) or the like may be used.

[Reference Literature 5] A. Vaswani, N. Shazeer, N. Parmar, J. Uszkoreit, L. Jones, A. N. Gomez, L. Kaiser, and I. Polosukhin, "Attention Is All You Need," in Proc. Adv. Neural Inf. Process. Syst. (NIPS), 2017.

Finally, a dimension of e is changed to $R^{D_a \times T}$, and e is normalized such that $|e|=1$.

For training of the embedded network, training using a triplet loss (refer to Reference Literature 6) or the like may be employed.

[Reference Literature 6] J. Wang, Y. Song, T. Leung, C. Rosenberg, J. Wang, J. Philbin, B. Chen, and Y. Wu. "Learning Fine-grained Image Similarity with Deep Ranking," in Proc. IEEE Int. Conf. Comput. Vis. Pattern Recognit. (CVPR), 2014.

In this training, the deep neural network is trained such that the following cost function is minimized.

[Math. 4]

$$\mathcal{L} = \max(0, D(e^a, e^p) - D(e^a, e^n) + \alpha) \tag{5}$$

Here, $\alpha$ is a margin coefficient and may be set to 0.3 or the like. In addition, each $e^a$, $e^p$, and $e^n$ denotes e calculated from audios called anchor, positive, and negative, respectively. Here, anchor is an input audio (in other words, it's a search key to retrieve audio similar to the input audio), positive is an audio corresponding to a caption randomly selected from among captions labeled as "similar" for anchor, and negative is an audio randomly selected from among audios that satisfy the following criteria among audios corresponding to captions labeled as "not similar" for anchor.

[Math. 5]

$$D(e^a, e^p) \leq D(e^a, e^n) < D(e^a, e^p) + \alpha \tag{6}$$

Caption Generation

Figure 3:
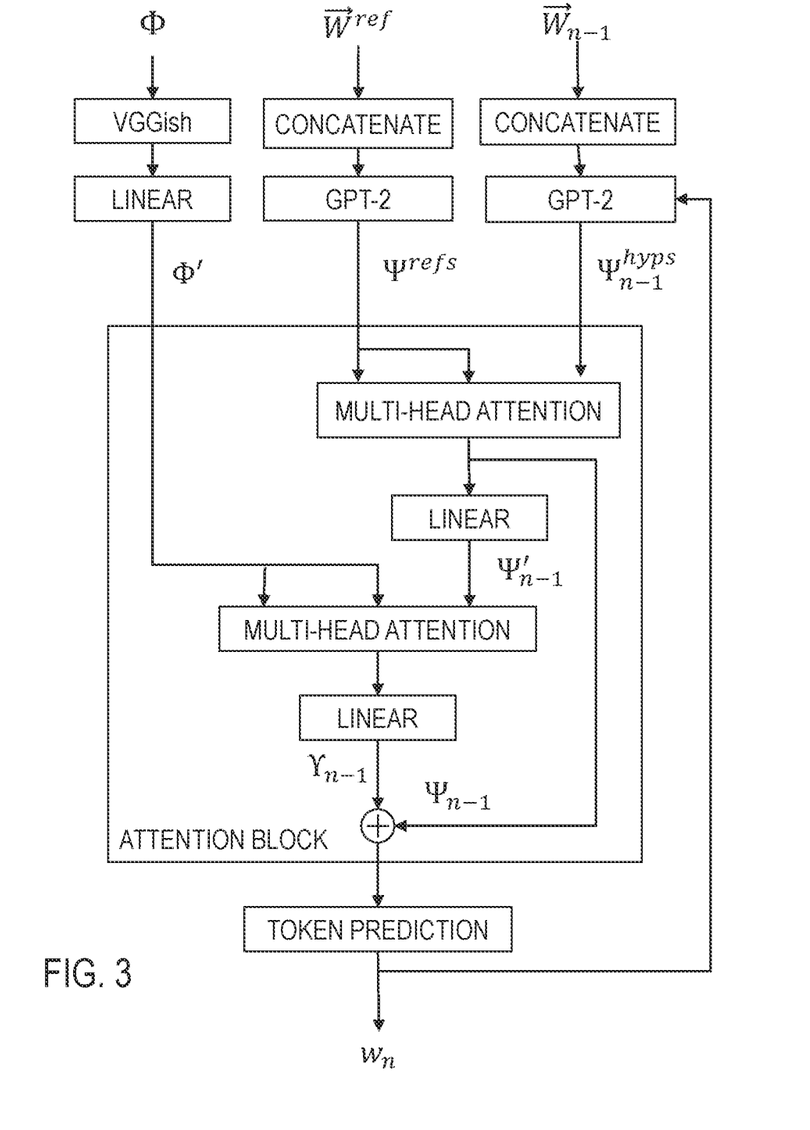
FIG. 3 is a diagram illustrating a procedure of generating a caption for an input audio signal.

FIG. 3 illustrates a processing procedure of the second module "caption generation". First, $\vec{w}^{ref}$ (a vector including guidance captions) and $\vec{w}_{n-1}$ (a vector including up to (n−1)-th output words) are independently input to the pre-trained language model. In the present invention, any pre-trained language model may be used, but here, a description will be made using GPT-2.

[Math. 6]

$$\Psi^{refs} = \text{GPT-2}(\vec{w}^{ref}) \tag{7}$$

$$\Psi^{hyps}_{n-1} = \text{GPT-2}(\vec{w}_{n-1}) \tag{8}$$

Here, $\Psi^{refs} \in R^{D1 \times M}$ and $\Psi^{hyps}_{n-1} \in R^{D1 \times (n-1)}$. In the case of general GPT-2 called "117M", $D_1 = 768$.

Next, in order to integrate these two pieces of information, a multi-head attention (MHA) layer disclosed in Reference Literature 5 above is used.

[Math. 7]

$$\Psi_{n-1} = \text{MultiHeadAttention}(\Psi^{hyps}_{n-1}, \Psi^{refs}) \tag{9}$$

Here, MultiHeadAttention (a,b) is a multi-head attention layer, a is used as a query, and b is used as a key and a value. Also, $\Psi_{n-1} \in R^{D1 \times (n-1)}$.

The multi-head attention layer is used to integrate a feature extracted from the observed signal. Here, in order to reduce the number of parameters, $\Psi'_{n-1}$ and $\Phi'$ obtained by reducing the dimension of $\Phi$ and $\Psi_{n-1}$ are input to the multi-head attention layer. The dimension reduction is performed by using a fully connected layer, and for example, the dimension is reduced to $D_r = 60$.

[Math. 8]

$$Y_{n-1} = \text{Linear}(\text{MultiHeadAttention}(\Psi'_{n-1}, \Phi')) \tag{10}$$

Here, Linear(•) is a fully connected layer for increasing the number of dimensions of outputs of the multi-head attention layer to $R^{D1}$.

Finally, $p(w_n | \Phi, \vec{w}_{n-1})$ is predicted by using an output layer pre-trained by GPT-2 by using a feature obtained by adding and $\Psi_{n-1} Y_{n-1}$.

[Math. 9]

$$p(\vec{w}_{n-1}) = \text{LMHead}(\Psi_{n-1} + Y_{n-1}) \tag{11}$$

Here, LMHead(•) is a token prediction layer trained in advance. The LMHead(•) is trained to adapt the decoder to statistics of words available in captions of the training data.

Training Procedure

A training procedure of each module used in the audio captioning of the present invention will be described.

Step-1: Pair data of an audio signal in the time domain and a corresponding caption is prepared. Hereinafter, this will be referred to as a "training data set".

Step-2: The similarity such as BERTScore for all combinations of captions included in the training data set is calculated. If the number of pieces of pair data included in the training data set is P, the number of combinations is P×(P−1). Then, the caption of the p-th pair data of the training data set and the captions of the other (P−1) pair data are labeled with "similar" or "not similar" according to the method described in <Guidance caption retrieval>.

Step-3: The deep neural network in the guidance caption retrieval is trained according to the method described in <Guidance caption retrieval>. A batch size in this case may be about 128.

Step-4: A caption generation module is trained. At the time of training, for $\vec{w}^{ref}$, K captions randomly selected from captions labeled with "similar" may be used, or K captions retrieved through guidance caption retrieval may be used. Here, K may be set to about 5. Any cost function may be used when training the whole, and for example, cross entropy between $p(w_n | \Phi, \vec{w}_{n-1})$ and $w_n$ may be used. The batch size may be set to about 512. The pre-trained language model may be updated simultaneously with other layers or fixed.

Embodiment

Hereinafter, an embodiment of the present invention will be described in detail. In the drawings, constituents having the same functions are denoted by the same reference numerals, and redundant description will be omitted.

Figure 4:
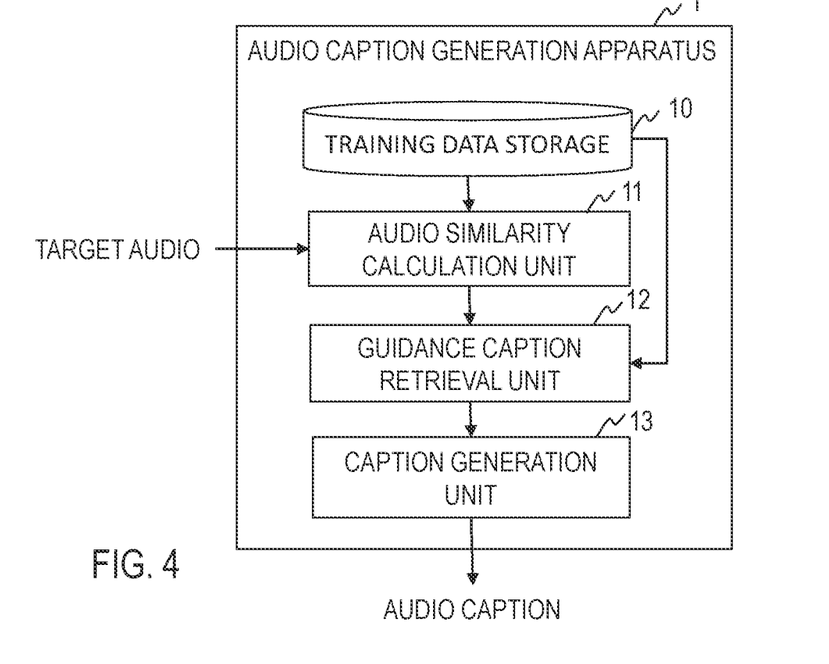
FIG. 4 is a diagram illustrating a functional configuration of an audio caption generation apparatus.

An embodiment of the present invention is an audio caption generation apparatus and method for generating a caption from an input audio signal that explains the input audio signal by using a training data set consisting of a set of the audio signal prepared in advance and the corresponding caption. As illustrated in FIG. 4, an audio caption generation apparatus 1 according to the embodiment includes, for example, a training data storage 10, an audio similarity calculation unit 11, a guidance caption retrieval unit 12, and a caption generation unit 13. The audio caption generation apparatus 1 executes the steps illustrated in FIG. 5 to execute the audio caption generation method of the embodiment.

The audio caption generation apparatus 1 is a special apparatus configured such that a special program is loaded onto a known or dedicated computer having, for example, a central processing unit (CPU), a main storage (random access memory (RAM)), and the like. The audio caption generation apparatus 1 executes each process under the control of the central processing unit, for example. Data input to the audio caption generation apparatus 1 or data obtained in each process is stored in, for example, a main storage, and the data stored in the main storage is loaded to the central processing unit as necessary and used for other processes. At least some of the processing units of the audio caption generation apparatus 1 may be configured by hardware such as an integrated circuit. Each storage unit included in the audio caption generation apparatus 1 may include, for example, a main storage such as a random access memory (RAM), an auxiliary storage including a hard disk, an optical disc, or a semiconductor memory element such as a flash memory, or middleware such as a relational database or a key value store.

Figure 5:
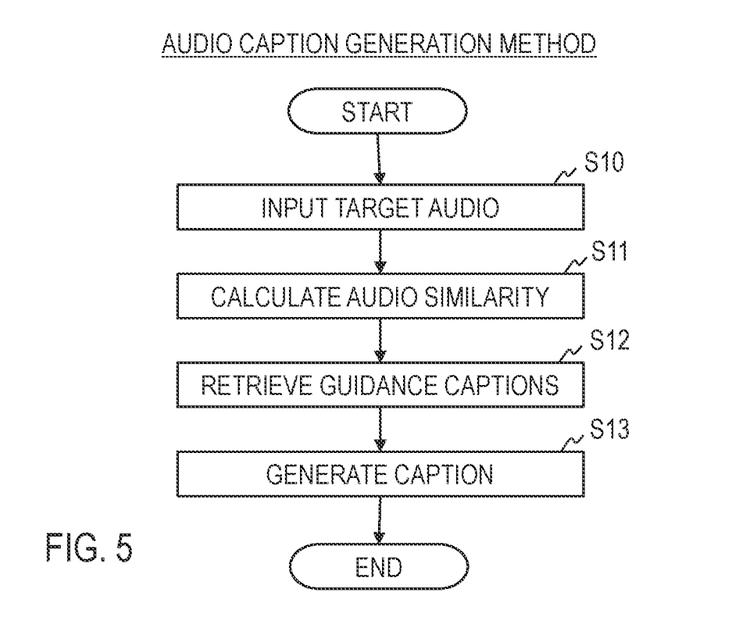
FIG. 5 is a diagram illustrating a processing procedure of an audio caption generation method.

Hereinafter, the audio caption generation method executed by the audio caption generation apparatus 1 according to the embodiment will be described with reference to FIG. 5.

The training data storage 10 stores a training data set including a plurality of pieces of training data. Each piece of training data includes an audio signal collected in advance and a correct caption manually assigned to each audio signal.

In step S10, an audio signal that is a caption generation target is input to the audio caption generation apparatus 1. Hereinafter, this audio signal will be referred to as a "target audio". The input target audio is input to the audio similarity calculation unit 11.

In step S11, the audio similarity calculation unit 11 reads the training data set stored in the training data storage unit 10, and calculates the audio similarity between the input target audio and each audio signal included in the training data set. The audio similarity to be calculated is as described in the above <Guidance caption retrieval>, and the audio similarity calculation unit 11 is configured such that the more similar a caption assigned to the first audio signal and a caption assigned to the second audio signal is, the more likely that a first audio signal and a second audio signal are determined to be similar. As the similarity between the captions, for example, BERTScore may be used. The audio similarity calculation unit 11 inputs the calculated audio similarity to the guidance caption retrieval unit 12.

In step S12, the guidance caption retrieval unit 12 acquires a plurality of pieces of training data similar to the input target audio on the basis of the audio similarity calculated by the audio similarity calculation unit 11. The guidance caption retrieval unit 12 inputs captions included in the acquired training data to the caption generation unit 13 as guidance captions.

In step S13, the caption generation unit 13 generates a caption for the target audio by determining words in order from the head on the basis of the guidance captions acquired by the guidance caption retrieval unit 12. A caption generation method is as described in the above <Caption generation>, and the current word is repeatedly determined by using a feature obtained by integrating the guidance captions, a generated word string from the head to the immediately preceding word of the current word, and the acoustic feature of the target audio by the pre-trained language model and the multi-head attention. The caption generation unit 13 outputs the generated caption for the target audio from the audio caption generation apparatus 1.

Test Result

In order to confirm the effect of the invention, a test was performed by using the AudioCaps data set (Non-Patent Literature 3). The test results are shown in Table 1. "Conventional" in the "Method" column is an evaluation result of the conventional technique disclosed in Non-Patent Literature 3, and "Ours" is an evaluation result of the present invention. As an evaluation index, $BLEU_1$ $BLEU_2$, $BLEU_3$, and $BLEU_4$ (written as B-1, B-2, B-3, and B-4 in the table), METEOR, CIDEr, $ROUGE_L$ (written as ROUGE-L in the table), and SPICE used in Non-Patent Literature 3 were used. As a comparison method, TopDown-AlignedAtt (INN) having the highest accuracy among those used in Non-Patent Literature 3 was used.

TABLE 1

| Method | B-1 | B-2 | B-3 | B-4 | METEOR | CIDEr | ROUGE-L | SPICE |
| --- | --- | --- | --- | --- | --- | --- | --- | --- |
| Conventional [3] | 61.4 | 44.6 | 31.7 | 21.9 | 20.3 | 59.3 | 45.0 | 14.4 |
| Ours | 63.8 | 45.8 | 31.8 | 20.4 | 19.9 | 50.3 | 43.4 | 13.9 |

The present invention only adds trainable layers slightly following the pre-trained language model. Nevertheless, as shown in Table 1, evaluation results comparable to those of the conventional technique that uses the carefully designed deep neural network architecture as shown in Non-Patent Literature 3 could be obtained. From this, it has been demonstrated that a caption can be generated with high accuracy from an audio signal by the present invention even in a case where an amount of training data is small.

The embodiment of the present invention has been described above. However, a specific configuration is not limited to this embodiment, and it goes without saying that an appropriate design change or the like not departing from the concept of the present invention is included in the present invention. The various processes described in the embodiment may be executed not only in chronological order according to the described order, but also in parallel or individually according to the processing capability of an apparatus that executes the processes or as necessary.

Program and Recording Medium

In a case where various processing functions in each apparatus described in the above embodiment are realized by a computer, processing contents of functions that each apparatus should have are described by a program. By causing a storage 1020 of a computer illustrated in FIG. 6 to load this program and causing a calculation unit 1010, an input unit 1030, an output unit 1040, and the like to execute the program, various kinds of processing functions in each of the above apparatuses are realized on the computer.

The program describing the processing content may be recorded in a computer-readable recording medium. The computer-readable recording medium is, for example, a non-transitory recording medium, and is a magnetic recording device, an optical disc, or the like.

Distribution of the program is performed by, for example, selling, transferring, or renting a portable recording medium such as a DVD or a CD-ROM on which the program is recorded. The program may be stored in a storage of a server computer, and the program may be distributed by transferring the program from the server computer to another computer via a network.

Figure 6:
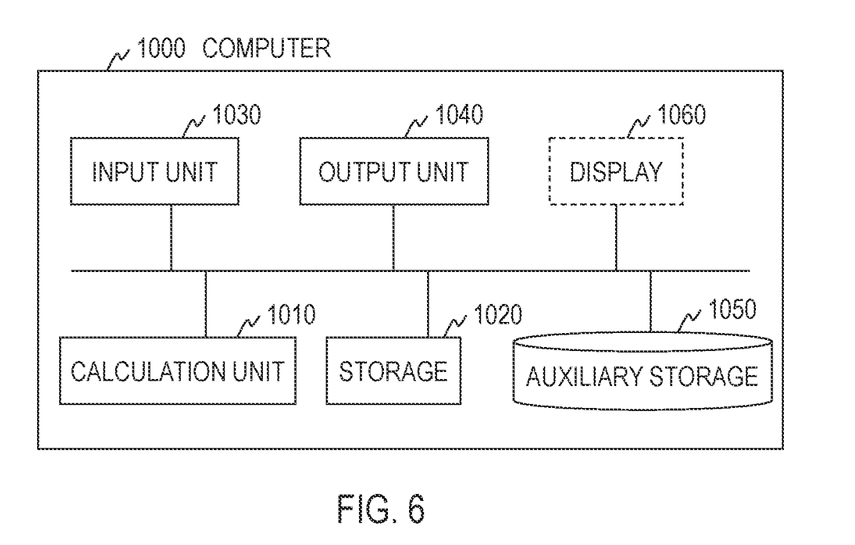
FIG. 6 is a diagram illustrating a functional configuration of a computer.

For example, the computer that executes such a program, first, temporarily stores the program recorded in a portable recording medium or the program transferred from a server computer in an auxiliary storage 1050 that is a non-transitory storage of the computer. At the time of executing the processing, the computer loads the program stored in the auxiliary storage 1050 that is a non-transitory storage of the computer, into the storage 1020 that is a temporary storage, and executes the processing according to the loaded program. As another embodiment of the program, a computer may directly load the program from a portable recording medium and execute processing according to the program, and the computer may sequentially execute processing according to the received program each time the program is transferred from a server computer to the computer. The above-described processing may be executed by a so-called application service provider (ASP) type service that realizes a processing function only according to an execution instruction and result acquisition without transferring the program from the server computer to the computer. The program described herein includes information used for processing by an electronic computer and equivalent to the program (data or the like that is not direct command to the computer but has property that defines the processing of the computer).

Although the present apparatus is configured by executing a predetermined program on a computer in the description above, at least part of the processing content may be realized by hardware.

What is claimed is:

1. An audio caption generation method of generating a caption for a target audio, the audio caption generation method comprising:

causing a guidance caption retrieval circuitry to acquire a plurality of captions corresponding to an audio signal similar to the target audio; and causing a caption generation circuitry to determine a current word of the caption for the target audio by using a feature obtained by integrating the acquired captions, a word string from the head of the caption for the target audio to an immediately preceding word of the current word, and an acoustic feature of the target audio.

2. The audio caption generation method according to claim 1, wherein the guidance caption retrieval circuitry is configured such that the more similar a caption for explaining a first audio signal and a caption for explaining a second audio signal is, the more likely that first audio signal and the second audio signal are determined to be similar.

3. A non-transitory computer-readable recording medium which stores a program for causing a computer to execute each step of the audio caption generation method according to claim 1.

4. An audio caption generation apparatus that generates a caption for a target audio, the audio caption generation apparatus comprising:

a guidance caption retrieval circuitry that acquires a plurality of captions corresponding to an audio signal similar to the target audio; and a caption generation circuitry that generates a current word of the caption for the target audio by using a feature obtained by integrating the acquired captions, a word string from the head of the caption for the target audio to an immediately preceding word of the current word, and an acoustic feature of the target audio.

* * * * *